United States Patent [19]

Witzke

[11] Patent Number: 4,860,415
[45] Date of Patent: Aug. 29, 1989

[54] METHOD OF MAKING A VEHICLE SEAT ASSEMBLY WITH POUR-IN-PLACE FOAM BODY

[75] Inventor: Duane W. Witzke, Adrian, Mich.

[73] Assignee: Hoover Universal, Inc., Ann Arbor, Mich.

[21] Appl. No.: 205,929

[22] Filed: Jun. 13, 1988

[51] Int. Cl.$^4$ ............................................. B29C 67/22
[52] U.S. Cl. ..................................... 29/91.1; 29/458; 264/46.4; 264/46.6; 264/46.8
[58] Field of Search ................... 264/45.1, 46.6, 46.7, 264/46.8, 46.4; 29/458, 91.1, 91.5

[56] References Cited

U.S. PATENT DOCUMENTS

| 3,161,436 | 12/1964 | Hood | 264/46.7 |
| 3,374,517 | 3/1968 | Worley | 29/91.1 |
| 3,971,112 | 7/1976 | Amato et al. | 29/460 |
| 4,542,887 | 9/1985 | Bethell et al. | 264/46.6 |

FOREIGN PATENT DOCUMENTS

| 51-008144 | 3/1976 | Japan | 264/46.6 |
| 59-189890 | 10/1984 | Japan | 264/46.6 |
| 60-234809 | 11/1985 | Japan | 264/46.7 |
| 62-196136 | 8/1987 | Japan | 264/46.6 |

Primary Examiner—Jan H. Silbaugh
Assistant Examiner—Allan R. Kuhns
Attorney, Agent, or Firm—Harness, Dickey & Pierce

[57] ABSTRACT

A method of manufacturing a portion of a seat. A cover member is shaped to a predetermined shape and placed in a foam molding tool into which is injected an expandable liquid foaming material to mold a foam pad which is integrally bonded to the cover member. In the manufacturing of seat backs, the cover member includes a tubular envelope cover positioned on a cantilever forming tool. Once the foam pad is molded, the cover member is turned inside out to enclose the foam pad with the cover member. The cover is then telescoped over a seat frame. Alternatively, the foam pad can be molded to a shaped fabric sheet, the envelope cover formed by sewing a second cover member to the fabric sheet. A seat cushion is made by shaping a cover member, placing the cover member in a foam molding tool which also holds the seat frame and injecting an expandable liquid foaming material into the mold to mold the foam cushion, bond the cushion to the cover and embed the seat frame in the foam. The edges of the cover are then wrapped around the side of the foam pad and attached to the frame. Alternatively, a side panel can be sewn to the cover and attached to the frame.

3 Claims, 5 Drawing Sheets

METHOD OF MAKING A VEHICLE SEAT ASSEMBLY WITH POUR-IN-PLACE FOAM BODY

BACKGROUND OF THE INVENTION

This invention relates generally to a method for manufacturing seats, and more particularly to a method for manufacturing vehicle seats wherein seat constructions are required which can be manufactured in large quantities at low costs and with a broad range of styling possibilities.

One method for making seats with a foam pad is illustrated in U.S. Pat. No. 2,955,972 issued to Wintermute, et al. The method shown in Wintermute uses a vacuum to shape the seat cover and is thereby limited for use with seat covers which are imperforate. The seat produced by Wintermute also has a foam pad which is bonded on all sides to either the cover or base panel.

It is an object of this invention to provide a vehicle seat construction which utilizes a foam pad which is formed by a pour-in-place process in which the foam pad is molded onto and integrally bonded to the seat trim cover. An advantage of this invention is lower overall production costs as well as a faster production process. It is a further advantage of this invention to use seat cover materials which are perforate. It is yet another advantage of this invention that the foam pad is only bonded to the load engaging surface of the cover which reduces the wrinkling of the side panels when the seat is loaded.

It is a further object of this invention to provide a method for manufacturing seats which enables the construction of seat trim covers that have soft back panels thereby eliminating the need for hard plastic panels, zippers or other fastener/attachments that are cost-incurring items in a seat trim cover, such as a cover for a vehicle seat back.

Because the seat trim cover is an integral assembly with a foam pad of the desired configuration enclosed therein, the product lends itself to a broader range of styling possibilities which is an obvious advantage in the field of automobile seating.

SUMMARY OF THE INVENTION

This invention utilizes a pour-in-place process to mold the foam pad used in the seat back and the seat cushion. The foam pad molded by this process conforms to the shape of the seat cover. This avoids difficulties in aligning a pre-shaped foam pad to the shape of the seat cover. This also results in a better fitting foam pad and seat cover, having fewer wrinkles than with a pre-shaped pad.

The method of this invention consists generally of the following steps. First, a portion of the seat trim cover is shaped to a predetermined shape. The portion that is shaped is the face of the seat cover that engages the seating load, i.e., the top of the seat cushion and the front of the seat back. This surface is referred to as the "A" surface. The method used to shape the seat trim cover can be used with vinyl, leather or cloth fabric materials which are perforate or imperforate. Additionally, the seat trim cover material is not stretched or thinned out by the shaping process.

Second, a foam pad is molded by a pour-in-place process using an expandable liquid foam material which molds the foam pad in place on the shaped, load engaging portion of the seat trim cover. The foam pad is thereby integrally bonded to the seat trim cover and molded to the predetermined shape of the seat trim cover. In this method, only the load engaging surface of the seat trim cover is bonded to the foam pad. The side faces of the seat trim cover are free to flex, thus reducing or eliminating wrinkles in the seat trim cover when a load is applied to the seat.

When making a seat back, the seat trim cover is an envelope cover, generally tubular in shape having an open end, a closed end, an inner side and an outer side. The envelope cover is turned inside out before shaping the load engaging face of the cover. The foam pad is molded and bonded onto the inner side of the load engaging face of the envelope cover. The envelope cover is then turned inside out again so the outer side is on the outside to enclose the foam pad and enable the cover to be telescoped over a supporting frame.

When making a seat cushion, a supporting frame is partially embedded in the foam pad. The frame extends from the opposite side of the foam pad from which the seat cover is bonded. The seat cover is pulled around the sides of the foam pad and attached to the seat frame extending from the foam pad.

BRIEF DESCRIPTION OF THE DRAWINGS

Further objects, features and advantages of the invention will become apparent from a consideration of the following description and the appended claims when taken in connection with the accompanying drawings in which:

DETAILED DESCRIPTION OF THE DRAWINGS

Figure 1:
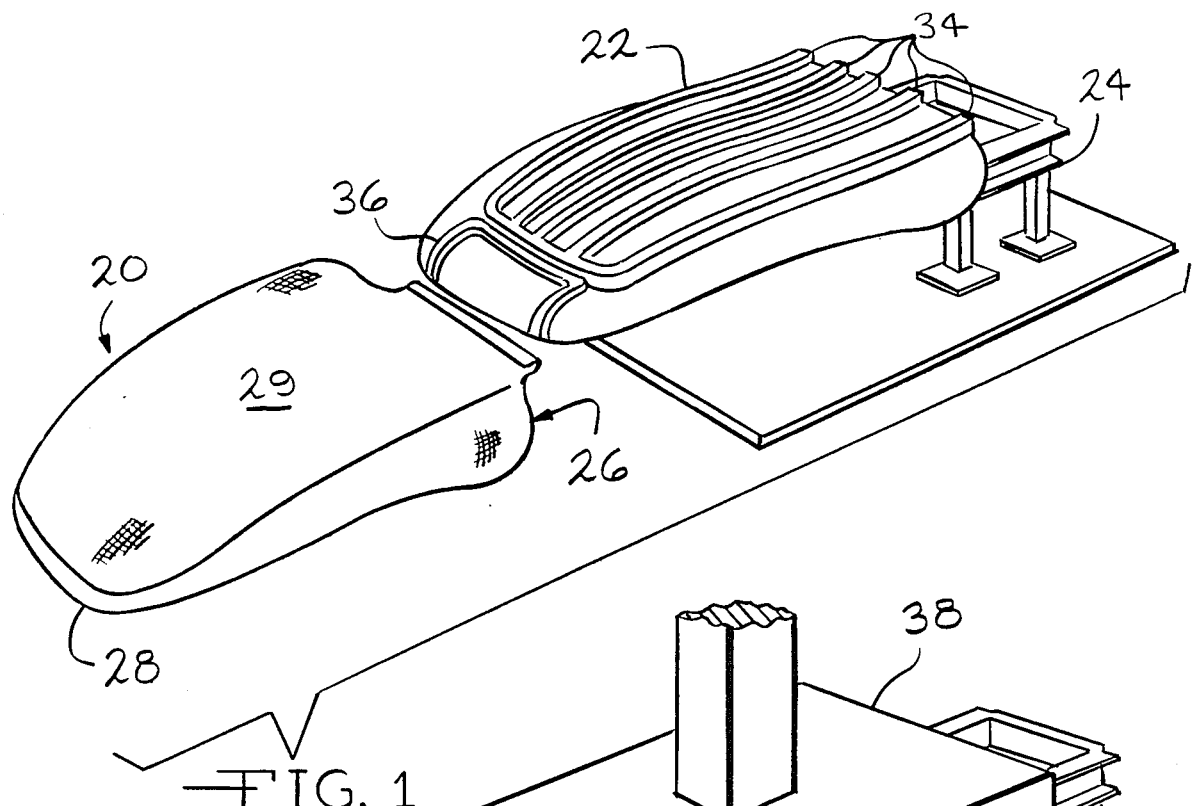
FIG. 1 is a perspective view of a cantilever forming tool illustrating an envelope cover which has been turned inside out, being mounted on the forming tool.

One method of making a seat back using the pour-in-place process for the foam pad is shown in FIGS. 1 through 7. With reference to the drawings, an envelope cover member of this embodiment, indicated generally at 20, is illustrated in FIG. 1 in a position in which it is about to be placed on a shaped forming tool member 22 that is cantilever supported on a support structure 24. The envelope cover member 20 is of a generally tubular shape having an open end 26, closed end 28, inner side and an outer side. In the position of the envelope cover 20, shown in FIG. 1, the inner side faces outwardly for a purpose to appear presently. The face 29 of cover member 20 is the load engaging or "A" surface of the cover member 20 as will be described below.

The forming tool 22 is shaped to provide a desired contour to the load engaging face 29 of the envelope cover 20 and, accordingly, is illustrated by having a plurality of upwardly extending inverted U-shaped projections 34 and headrest section 36. It is to be understood that the forming tool 22 can be substantially any shape desired for the seat back. The envelope cover 20 is telescoped, open end 26 first, over tool 22 to a position in which substantially the entire cover member 20 is supported on the forming tool 22 which is cantilever supported on the support structure 24 to enable the cover member 20 to be telescoped thereover.

Figure 2:
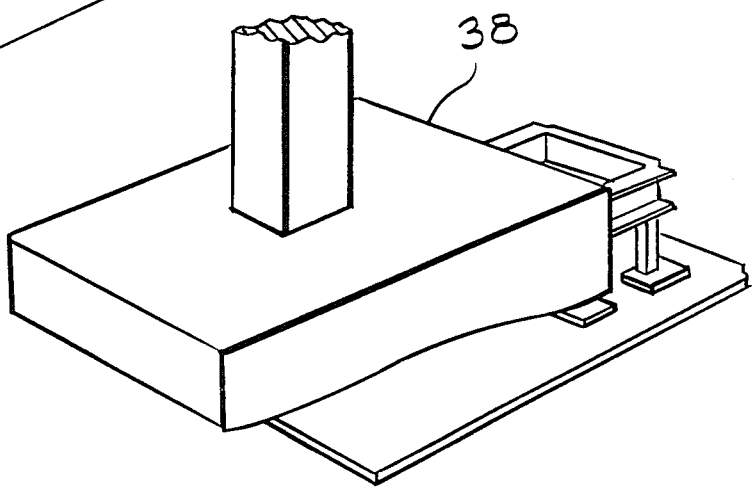
FIG. 2 is a perspective view illustrating a second forming tool over the envelope cover mounted on the cantilever forming tool.
Figure 3:
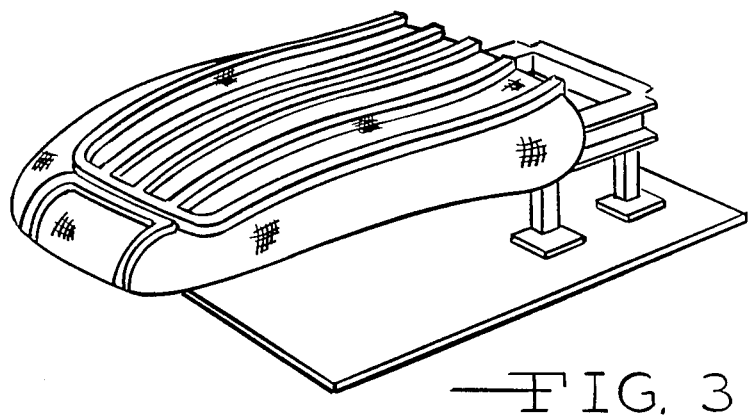
FIG. 3 is a perspective view like FIG. 1 illustrating the shaped envelope cover mounted on the cantilever forming tool.

Shown in FIG. 2, a second forming tool 38 is lowered onto the envelope cover 30 so as to form the load engaging face 29 of the cover 30 to the shape of the forming tool 22. The forming tools 22 and 38 are of complementary shape so as to sandwich the cover member 20 therebetween and shape of the envelope cover 20 to the shape of the forming tool 22. Heat and pressure are applied to the tools 22 and 38 to facilitate forming of the envelope cover 20 to the desired shape. FIG. 3 shows the envelope cover 20 on forming tool 22 after envelope cover 20 has been shaped.

Figure 4:
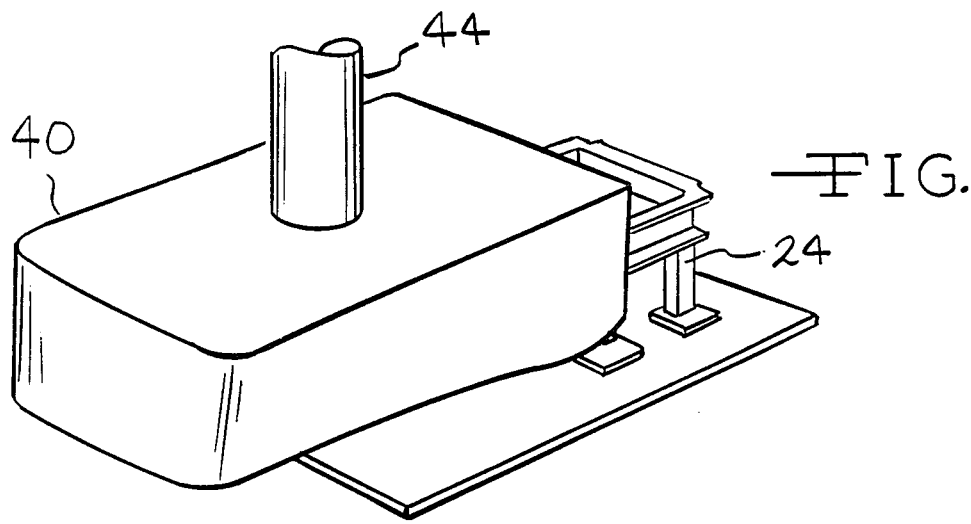
FIG. 4 is a perspective view illustrating the pour-in-place foam molding tool telescoped over the cover and cantilever forming tool.
Figure 5:
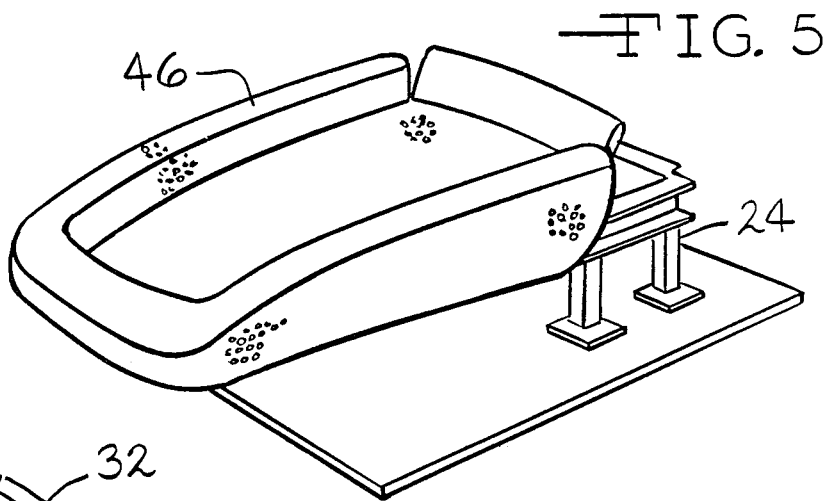
FIG. 5 is a perspective view illustrating the molded foam pad bonded to the envelope cover mounted on the cantilever forming tool.

As shown in FIG. 4, a foam molding tool 40 is then positioned over the envelope cover 20. Foam molding tool is used for molding a foam pad by pouring-in-place an expandable liquid foaming material. The liquid foaming material is injected into the foam molding tool 40 through opening 44. This molding operation is performed in such a manner that foam pad 46 is molded and integrally bonded to the inner side of the load engaging face 29 of envelope cover member 20 and formed to the shaped contour of load engaging face 29. The foam pad 46 is shown in FIG. 5 molded and bonded to the inner side of load engaging face 29 of cover member 20.

After the foam pad has cured, the assembly consisting of the envelope cover 20 and foam pad 46 is moved lengthwise off the cantilever supported forming tool 22.

Figure 6:
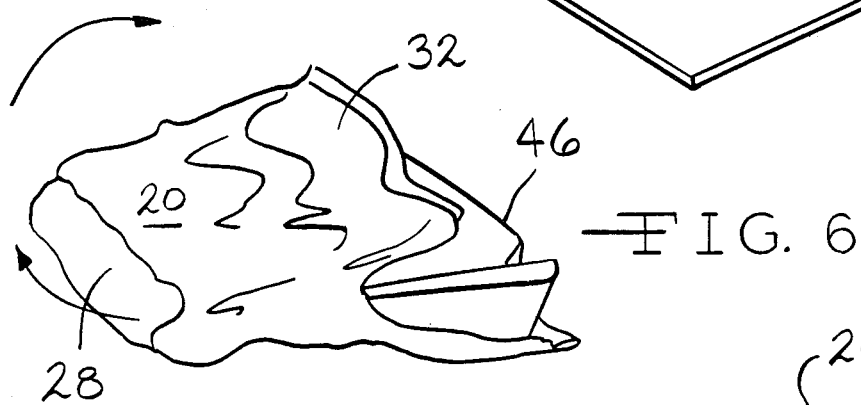
FIG. 6 is a perspective view illustrating the cover being turned right side out so as to enclose the pad.
Figure 7:
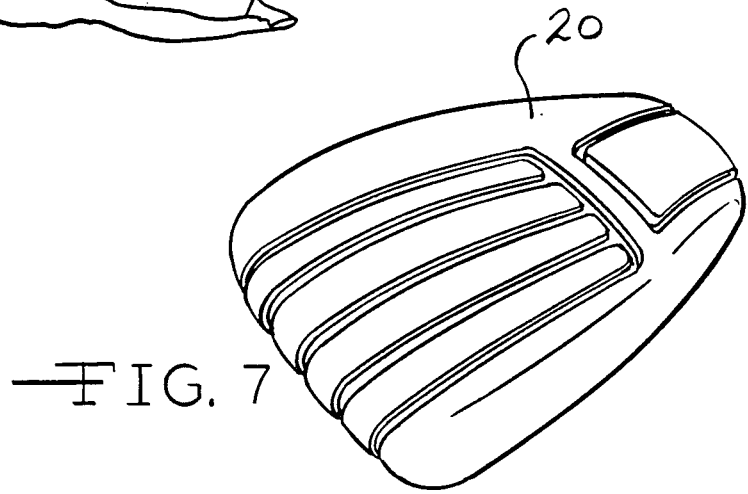
FIG. 7 is a perspective view illustrating the envelope cover and pad assembly.

The envelope cover 20 is then manipulated as shown in FIG. 6 such that the outer side of the envelope cover 20 is on the outside and the foam pad 46 is enclosed in the envelope cover 20. The resulting assembly shown in FIG. 7 can then be telescoped over a supporting seatback frame.

By making a seat back in this manner, the envelope cover member 20 is bonded to the foam pad only on the load engaging "A" surface 29 of the envelope cover member 20. In other words, only the portion of the envelope cover member 20 which engages the seating load is bonded to the foam pad 46. This reduces or eliminates the wrinkling of the sides of envelope cover member 20 which can occur during loading of the seat if the side faces of the cover member 20 are also bonded to the foam pad.

The seat assembly produced by this method can be readily manufactured while still allowing a broad range of styling possibilities since the construction of the forming tools 22 and 38 controls the style that is imparted to the envelope cover 20 and the foam pad 46. The structure of the forming tools 22 and 38 can readily be varied to achieve a desired styling result.

Figure 18:
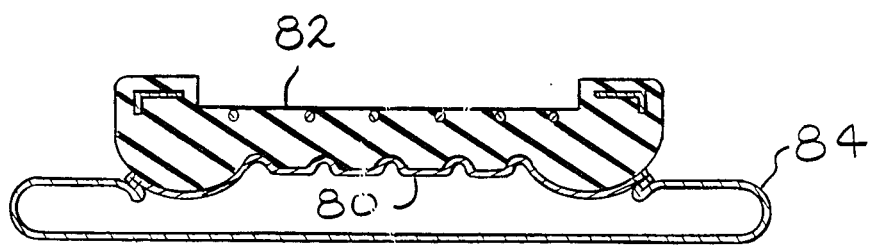
FIG. 18 is a sectional view illustrating an alternative embodiment of the seat back with a back panel attached to the cover member.
Figure 19:
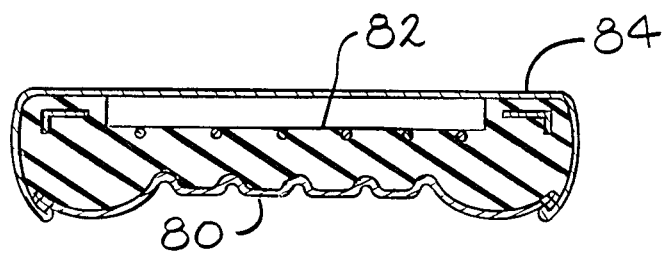
FIG. 19 is the same view as FIG. 18 after the back panel and seat cover are turned right side out to enclose the foam pad.

An alternative method for making the seat back is shown in FIGS. 18 and 19. In this method, a cover member 80 is used instead of the envelope cover member 20 shown in FIG. 1. Like envelope cover 20, cover 80 has inner and outer sides. Cover member 80 is first formed to a predetermined shape. The shaped cover member 80 is placed in a pour-in-place foam mold where a foam pad 82 is formed by pouring an expandable liquid foam into the mold, thereby molding a foam pad 82 which is bonded to the inner side of cover member 80. A back panel member 84 is attached to edges of the outer side of cover member 80 thereby forming an envelope having an open end. Back panel 84 is attached to cover member 80 by sewing or other methods known in the art. The envelope is then manipulated in such a manner that foam pad 82 is inside the envelope formed by cover member 80 and back panel 84. A cross section of the enclosed foam paid is shown in FIG. 19. The resulting assembly can then be telescoped over a supporting seatback frame.

There are several benefits to the use of the pour-in-place process to mold the foam pad instead of using a pre-shaped pad. The overall production cost is lower, eliminating the step of attaching a foam pad to the cover. In addition, there are no difficulties associated with aligning a pre-shaped pad with the shape cover thereby resulting in a better fitting cover and a faster production process.

Figure 8:
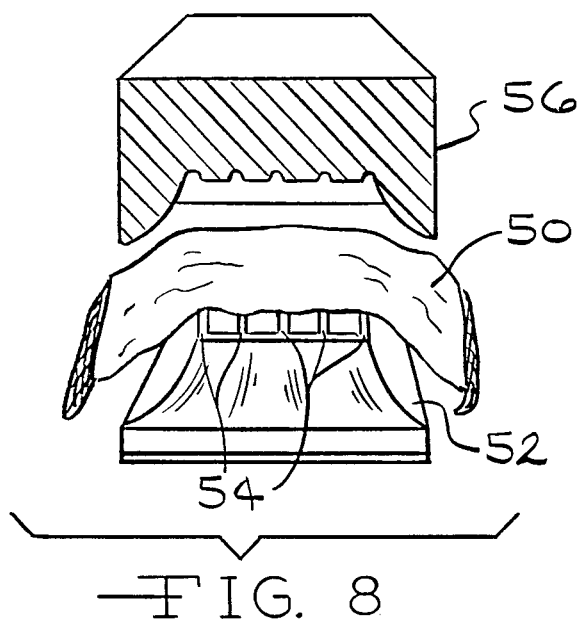
FIG. 8 is a perspective, partial sectional view of the seat cover member and two forming tools.
Figure 9:
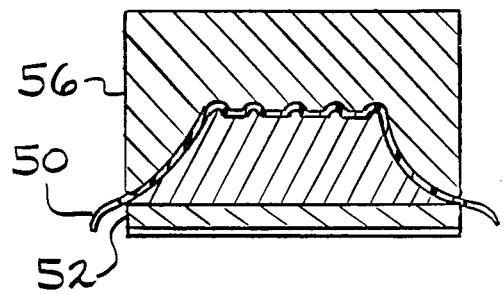
FIG. 9 is a sectional view illustrating the seat cover between the engaging forming tools shown in FIG. 8.
Figure 10:
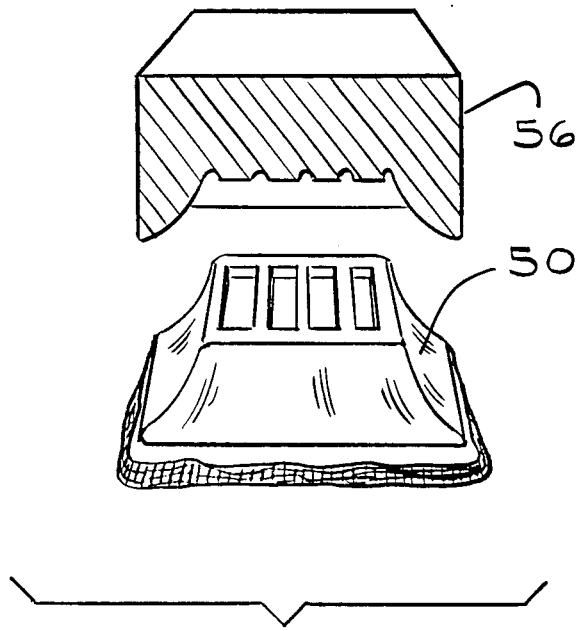
FIG. 10 is the view of the structure shown in FIG. 8 after the seat cover has been shaped by the forming tools.

The seat cushion of the present invention is manufactured in the following manner. Referring to FIG. 8, seat cover member 50 is placed over a forming tool 52 which is shaped to provide a desired contour to the load engaging face of the seat cover member 50. Forming tool 52 is illustrated in FIG. 8 as having a number of upwardly extending inverted U-shaped projections 54. It is to be understood that the forming tool 52 can be substantially any shape desired for the seat cushion. A second forming tool 56 is placed over the cover member 50 so as to conform the load engaging face of cover member 50 to the desired shape of forming tool 52 as shown in FIG. 9. The forming tools 52 and 56 are of complementary shape so as to sandwich the cover member 50 to the desired shape as shown in FIG. 9. Again, heat and pressure are applied to the tools 52 and 56 so as to facilitate the forming of the seat cover 50 to the desired shape. FIG. 10 shows the cover member 50 overlaying forming tool 52 after having been shaped by forming tools 52 and 56.

Figure 11:
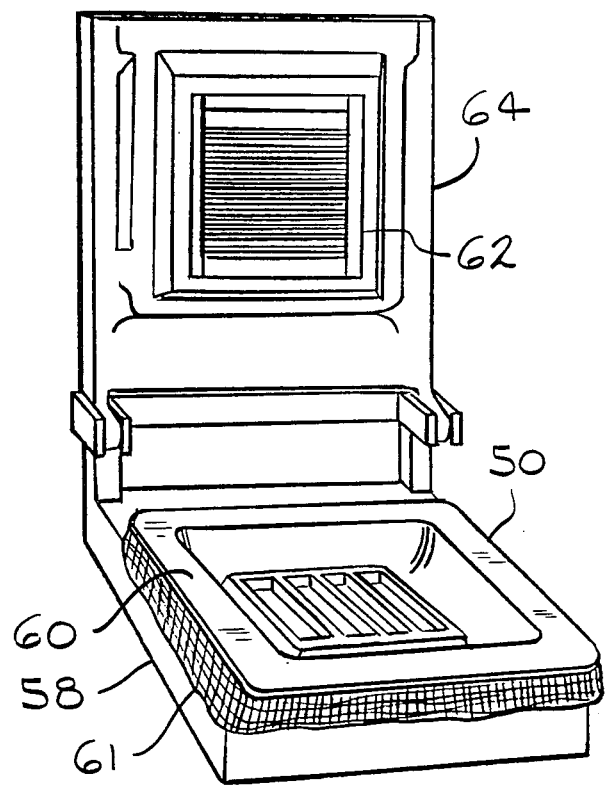
FIG. 11 is a perspective view illustrating the shaped cover member in a lower mold member with seat frame mounted in an upper mold member.

After shaping, cover member 50 is removed from forming tool 52 and placed in lower mold member 58 as shown in FIG. 11. A portion of cover member 50 extends beyond the cavity of lower mold member 58, this is shown as the cover member side portion 60 and cover member skirt portion 61 which extends around all four sides of mold cavity of lower mold member 58. The seat support frame 62 is mounted in upper mold member 64.

Figure 12:
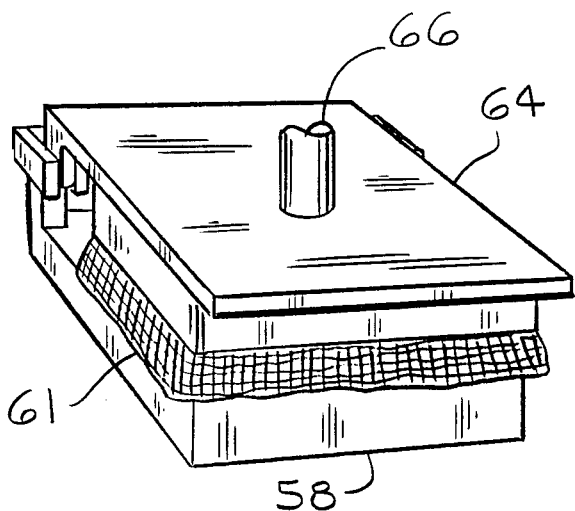
FIG. 12 is a perspective view illustrating the seat cover enclosed in the pour-in-place foam mold.
Figure 13:
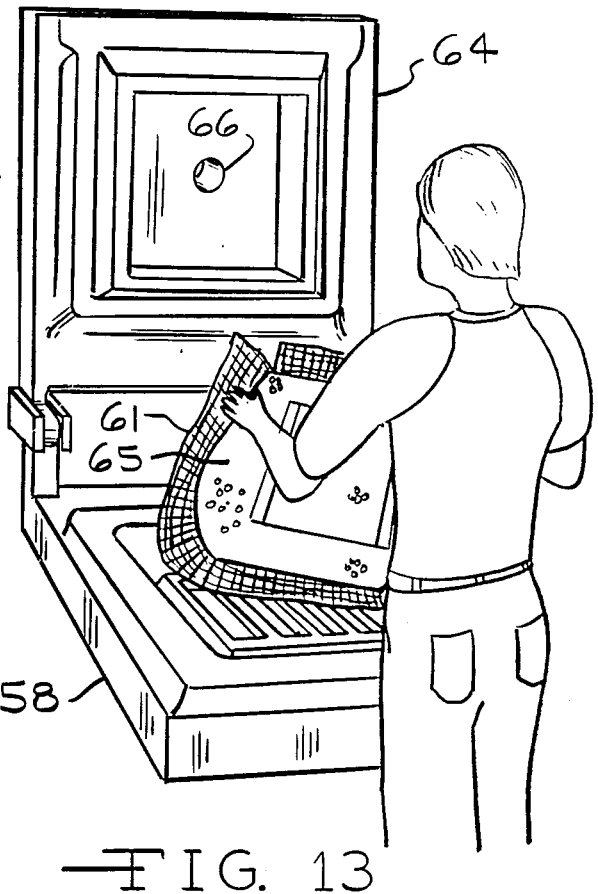
FIG. 13 is a perspective view illustrating the seat cushion assembly of the seat cover, foam pad and support frame being removed from the pour-in-place foam mold.

Upper mold member 64 is then lowered into position above lower mold member 58 as shown in FIG. 12. The skirt portion 61 of cover member 50 extends from the mold. In this position, the support frame 62 is spaced apart from cover member 50 forming a mold cavity therebetween. An expandable liquid foam material is injected into the mold cavity through the opening 66 in the upper mold member 64. In so doing, a foam pad is molded which is integrally bonded to the load engaging face of cover member 50 and has embedded therein a portion of support frame 62. FIG. 13 shows the assembly comprising the foam pad 65 having a portion of support frame 62 embedded therein and having the cover member 50 bonded thereto, being removed from the mold.

Figure 14:
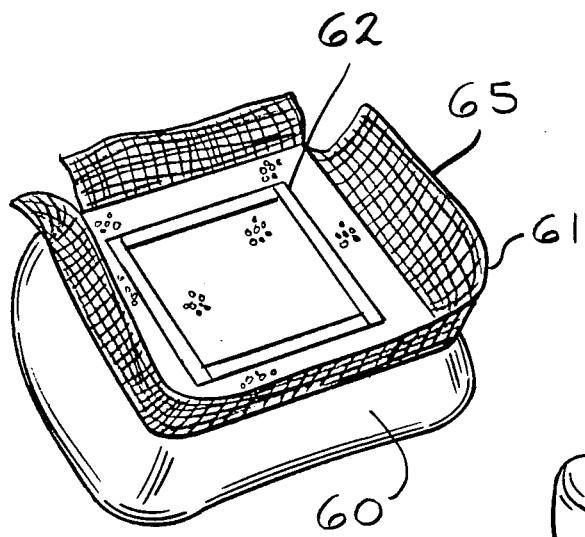
FIG. 14 is a perspective view of the bottom of the seat cushion.
Figure 15:
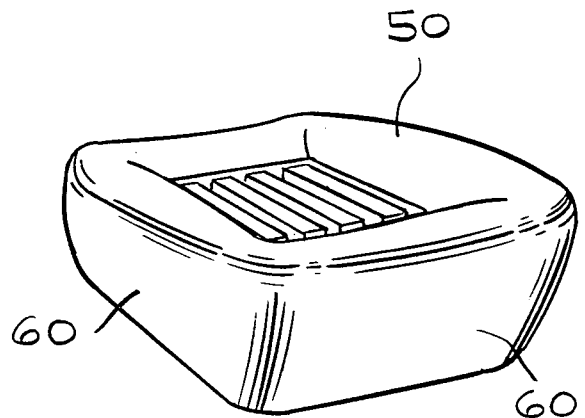
FIG. 15 is a perspective view of the top of the seat cushion.

A portion of the support frame 62 extends from the foam pad 65 as shown in FIG. 14. The skirt portion 61 of cover member 50 is pulled under the seat and attached to the portion of support frame 62 which extends from foam pad 65. The completed seat assembly is shown in FIG. 15.

Figure 16:
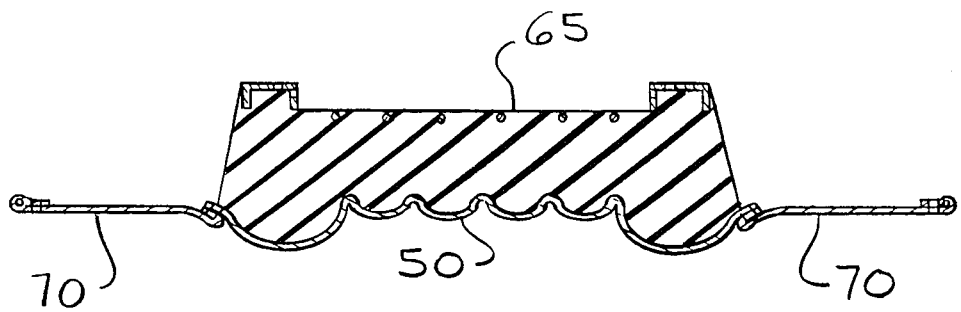
FIG. 16 is a sectional view illustrating an alternative embodiment of the seat cushion with side panels attached to the seat cover.
Figure 17:
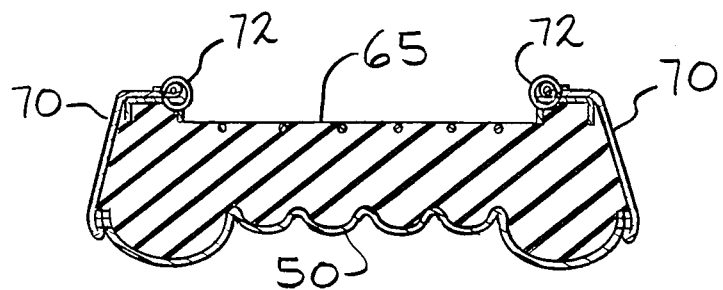
FIG. 17 is the same view as FIG. 16 with the side panels attached to the seat frame.

FIGS. 16 and 17 show an alternative method of making the seat cushion. In this alternative method, the side portion 60 and skirt portion 61 of cover member 50 are cut off from cover member 50. Enough material is left to attach a side panel 70. Side panel 70 can be attached by sewing or other methods well known in the art. Side panel 70 is then wrapped around foam pad 65 and attached to support frame 62 extending from foam pad 65. This attachment can be accomplished using hog rings 72 or other fasteners known in the art. This method allows a different material to be used for the side panel 70 then used for the load engaging face of the seat cushion.

As with the seat back manufacturing process described above, the pour-in-place process results in lower overall production costs, a faster production process and a better fitting foam pad and cover.

I claim:

1. A method of manufacturing at least a portion of a seat said seat including a supporting frame, a foam pad mounted on said frame, and an envelope cover member over said foam pad, said member being generally tubular in shape and having an open end and inner and outer sides and a seating load engaging portion having a predetermined shape, comprising the steps of:
    a. turning said envelope cover member inside out so that said inner side is on the outside of said envelope cover member;
    b. telescoping said cover member onto a forming tool;
    c. shaping the load engaging portion of said envelope cover member to said predetermined shape;
    d. molding said foam pad in place upon said load engaging portion of said envelope cover member by pouring-in-place an expandable liquid foaming material in such a manner that said foam pad is bonded to said load engaging portion and conformed in shape to the shape of said load engaging portion of said envelope cover;
    e. manipulating said envelope cover member so that said outer side is on the outside of said envelope cover member and said foam pad is enclosed therein; and
    f. telescoping said envelope cover member with said foam pad therein open end first over and onto said supporting frame.

2. The method of claim 1 wherein:
    said shaping is performed by application of heat and pressure to said load engaging portion of said envelope cover member.

3. A method of forming at least a portion of a vehicle seat, said seat including a support frame, an envelope cover member of a generally tubular shape having an open end, a seating load engaging portion having a predetermined shape, a closed end, and inner and outer sides, and a foam pad molded in place onto said portion and to the inner side of said cover member, comprising the steps of:
    a. turning said envelope cover member inside out so that said outer side is on the inside of said envelope cover member;
    b. telescoping said cover member onto a forming tool having said predetermined shape so that said load engaging portion is against said predetermined shape of said forming tool;
    c. shaping said portion to said predetermined shape;
    d. positioning a foam mold over and onto said load engaging portion;
    e. molding said foam pad in place onto said load engaging portion of said cover member by injecting an expandable foam into said mold so that said foam pad is bonded to said load engaging portion;
    f. removing said mold from said foam pad and said cover member;
    g. removing said cover member with said foam pad bonded thereto from said forming tool;
    h. turning said envelope cover member outside out so that said foam pad is enclosed therein; and
    i. telescoping said cover member and pad onto said supporting frame.

* * * * *